(12) United States Patent
Nishizawa

(10) Patent No.: US 6,917,851 B2
(45) Date of Patent: Jul. 12, 2005

(54) DATA PRINTING METHOD FOR INJECTION MOLDING MACHINE

(75) Inventor: Chiharu Nishizawa, Nagano (JP)

(73) Assignee: Nissei Plastic Industrial Co., Ltd., Nagano (JP)

( * ) Notice: Subject to any disclaimer, the term of this patent is extended or adjusted under 35 U.S.C. 154(b) by 253 days.

(21) Appl. No.: 10/305,150

(22) Filed: Nov. 27, 2002

(65) Prior Publication Data

US 2003/0120834 A1 Jun. 26, 2003

(30) Foreign Application Priority Data

Dec. 26, 2001 (JP) ........................................ 2001-393967

(51) Int. Cl.[7] .............................................. G06F 13/10
(52) U.S. Cl. ........................................ 700/200; 710/72
(58) Field of Search .......................... 710/8, 11, 14–16, 710/65, 72; 358/1.1, 1.6, 1.13–1.15; 700/200, 201

(56) References Cited

U.S. PATENT DOCUMENTS

| | | | | | |
|---|---|---|---|---|---|
| 5,165,014 A | * | 11/1992 | Vassar | .................... | 358/1.13 |
| 5,303,336 A | * | 4/1994 | Kageyama et al. | ........ | 358/1.15 |
| 5,467,434 A | * | 11/1995 | Hower et al. | .............. | 358/1.15 |
| 5,580,177 A | * | 12/1996 | Gase et al. | ................... | 400/61 |
| 5,974,474 A | * | 10/1999 | Furner et al. | .................. | 710/8 |
| 6,094,276 A | * | 7/2000 | Yamaguchi et al. | ....... | 358/1.15 |
| 6,249,835 B1 | * | 6/2001 | Isoda | ....................... | 710/100 |
| 6,469,796 B1 | * | 10/2002 | Leiman et al. | ............. | 358/1.15 |
| 6,780,113 B2 | * | 8/2004 | Nojiri et al. | .................. | 463/47 |
| 2002/0030852 A1 | * | 3/2002 | Matsuo | ...................... | 358/1.15 |
| 2002/0059482 A1 | * | 5/2002 | Ashizaki et al. | ............... | 710/5 |
| 2002/0068636 A1 | * | 6/2002 | Nojiri et al. | .................. | 463/47 |
| 2003/0081237 A1 | * | 5/2003 | Ogiwara et al. | ........... | 358/1.14 |

FOREIGN PATENT DOCUMENTS

| | | | | |
|---|---|---|---|---|
| JP | 05-057748 A | * | 3/1993 | |
| JP | 05-096590 A | * | 4/1993 | |
| JP | 2000-020258 A | * | 1/2000 | |
| JP | 2000-025084 A | * | 1/2000 | |
| JP | 3155742 B2 | | 2/2001 | |

* cited by examiner

*Primary Examiner*—Maria N. Von Buhr
(74) *Attorney, Agent, or Firm*—Birch, Stewart, Kolasch & Birch, LLP

(57) ABSTRACT

A printer is connected to a printer connection section of an injection molding machine in order to print data regarding the injection molding machine. A controller of the injection molding machine has a printer judgment function for determining a type of the printer, and a data conversion function for converting print data to control codes suitable for the type of the printer. Before printing, a type of the printer connected to the printer connection section is determined by means of the printer judgment function. During printing, print data are converted to control codes suitable for the determined type of the printer by means of the data conversion function, and the control codes are transmitted to the printer.

7 Claims, 3 Drawing Sheets

DATA PRINTING METHOD FOR INJECTION MOLDING MACHINE

BACKGROUND OF THE INVENTION

1. Field of the Invention

The present invention relates to a data printing method for an injection molding machine which is adapted to print data by use of a printer connected to a printer connection section of the injection molding machine.

2. Description of the Relevant Art

In general, when data stored in an injection molding machine are to be printed, a separately provided printer is connected to the injection molding machine, and caused to print the data. Specifically, as in the case of an injection molding machine M shown in FIG. 3, a connector (printer connection section) 27 is provided on a front panel portion 25f, and a printer P is connected to the connector 27 by use of a printer cable 29. Subsequently, various types of data stored in the controller of the injection molding machine are printed by use of the printer P.

Incidentally, the controller of such an injection molding machine has a function of converting data to be printed (hereinafter referred to as "print data") to data that match the type of a printer to be used. This function enables use of different types of printers sold on the market. For example, the conventional injection molding machine disclosed in Japanese Patent No. 3155742 is designed to output to a printer data in any of various printer output formats corresponding to different types of printers which users may connect to the injection molding machine. Further, the injection molding machine enables a user to select a transmission data format suitable for the type of a printer which the user has connected to the injection molding machine.

However, the conventional injection molding machine (data printing method) has the following drawbacks.

First, whenever an operator (user) connects a different printer to the injection molding machine, the operator must perform a cumbersome operation of selecting and setting a transmission data format suitable for the type of the printer. Further, the operator must have some degree of knowledge regarding printer connection. Moreover, an unnecessary increase in the number of production steps results in decreased production efficiency and deteriorated convenience.

Second, the conventional injection molding machine employs a scheme which displays manufacturer names and printer types on a display and which requests the operator to select one of the displayed manufacturer names and one of the printer types. Therefore, the conventional injection molding machine is not satisfactory in terms of general use and expansion; e.g., types of usable printers are limited, and the machine cannot flexibly cope with a new printer.

SUMMARY OF THE INVENTION

An object of the present invention is to provide a data printing method for an injection molding machine which eliminates the necessity of knowledge regarding printer connection and cumbersome setting operation, while eliminating an unnecessary increase in the number of production steps, to thereby enhance production efficiency and convenience.

Another object of the present invention is to provide a data printing method for an injection molding machine which enables printing of data by use a printer of a new type connected to the injection molding machine, to thereby enhance compatibility and expandability.

In order to achieve the object as described above, the present invention provides a data printing method for an injection molding machine adapted to print data by use of a printer connected to a printer connection section of the injection molding machine. The method comprises the steps of providing, in a controller of the injection molding machine, a printer judgment function for determining a type of the printer, and a data conversion function for converting print data to control codes suitable for the type of the printer; determining, before printing, a type of the printer connected to the printer connection section by means of the printer judgment function; and converting, during printing, print data to control codes suitable for the determined type of the printer by means of the data conversion function.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known features is omitted.

First, the configuration of an injection molding machine M in which a data printing method of the present embodiment can be practiced will be described with reference to FIGS. 2 and 3.

Figure 3:
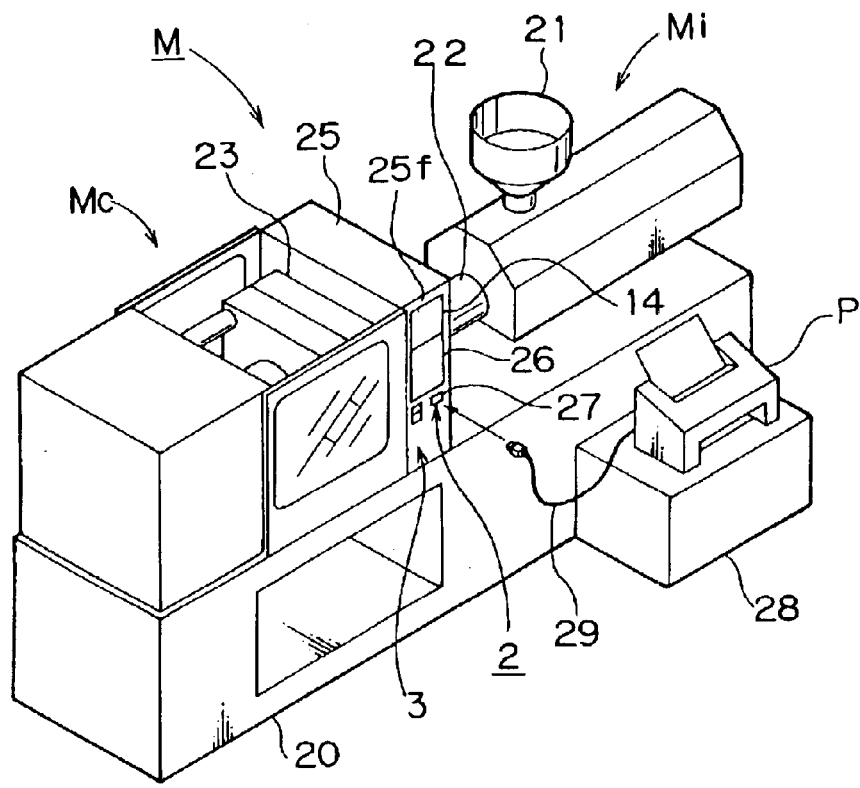
FIG. 3 is a perspective view of the injection molding machine in which the data printing method can be practiced.

FIG. 3 shows the structure of the injection molding machine M, which includes a machine base 20. An injection apparatus Mi having a hopper 21 and a heating barrel 22 is disposed on the top face of the machine base 20 to be located on one side thereof, and a mold clamp apparatus Mc supporting a movable half of a mold 23 is disposed on the top face of the machine base 20 to be located on the other side thereof. A housing 25 is disposed in the vicinity of a stationary platen supporting a stationary half of the mold 23. An operation section 26 is provided on a front panel portion 25f of the housing 25. The operation section 26 includes a display 14 and a keyboard.

Further, a connector 27, which serves as a printer connection section 2, is provided on the front panel portion 25f to be located below the operation section 26. Meanwhile, a printer pedestal 28 is disposed in the vicinity of the injection molding machine M; and a printer P is mounted on the printer pedestal 28. A connector provided on the back face of the printer P is connected to the connector 27 provided on the injection molding machine M by use of a printer cable 29. A USB cable and other types of printer cables for parallel ports and serial ports can be used as the printer cable 29.

Figure 2:
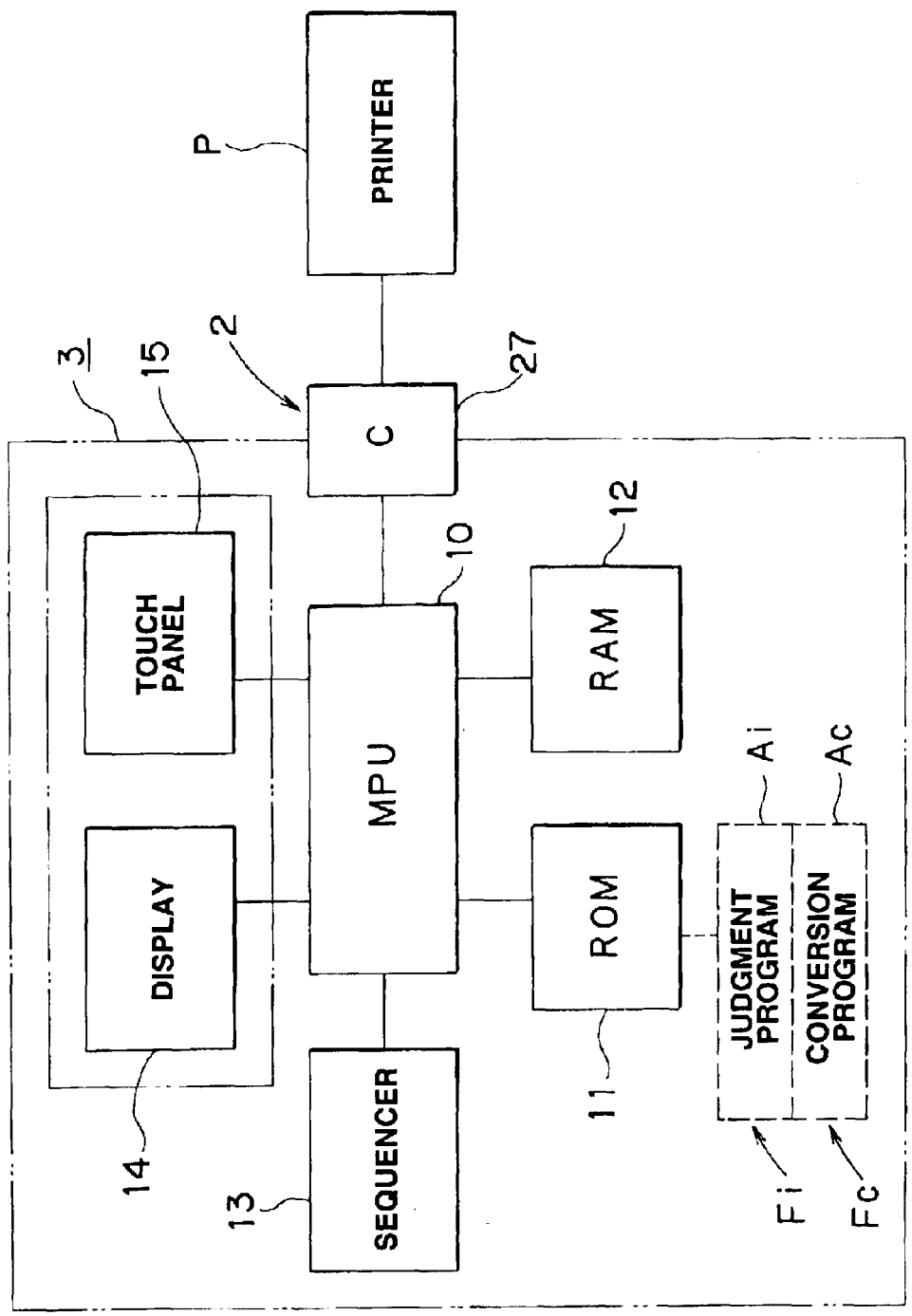
FIG. 2 is a block diagram of a controller provided in the injection molding machine in which the data printing method can be practiced.

FIG. 2 shows a block diagram of a control 3 provided in the injection molding machine M. In FIG. 2, reference numeral 10 denotes an MPU (micro processor unit); and the above-described connector 27 is connected to the MPU 10 via a bus line. Further, ROM 11 and RAM 12 are connected to the MPU 10 via the bus line. The ROM 11 stores a judgment program Ai for determining a type of the printer P, and a conversion program Ac for converting print data to control codes suitable for the type of the printer P. The conversion program Ac includes a plurality of sub-programs for converting print data to different types of control codes employed by representative printer manufacturers. The judgment program Ai realizes a printer judgment function Fi; and the conversion program Ac realizes a data conversion function Fc. Note that the MPU 10, the ROM 11, and the RAM 12 serve as a computer processing section. Moreover, a sequencer 13 for performing various types of sequence control is connected to the MPU 10 via the bus line; and the display 14 and a touch panel 15 provided on the display 14 are connected to the MPU 10 via the bus line.

Figure 1:
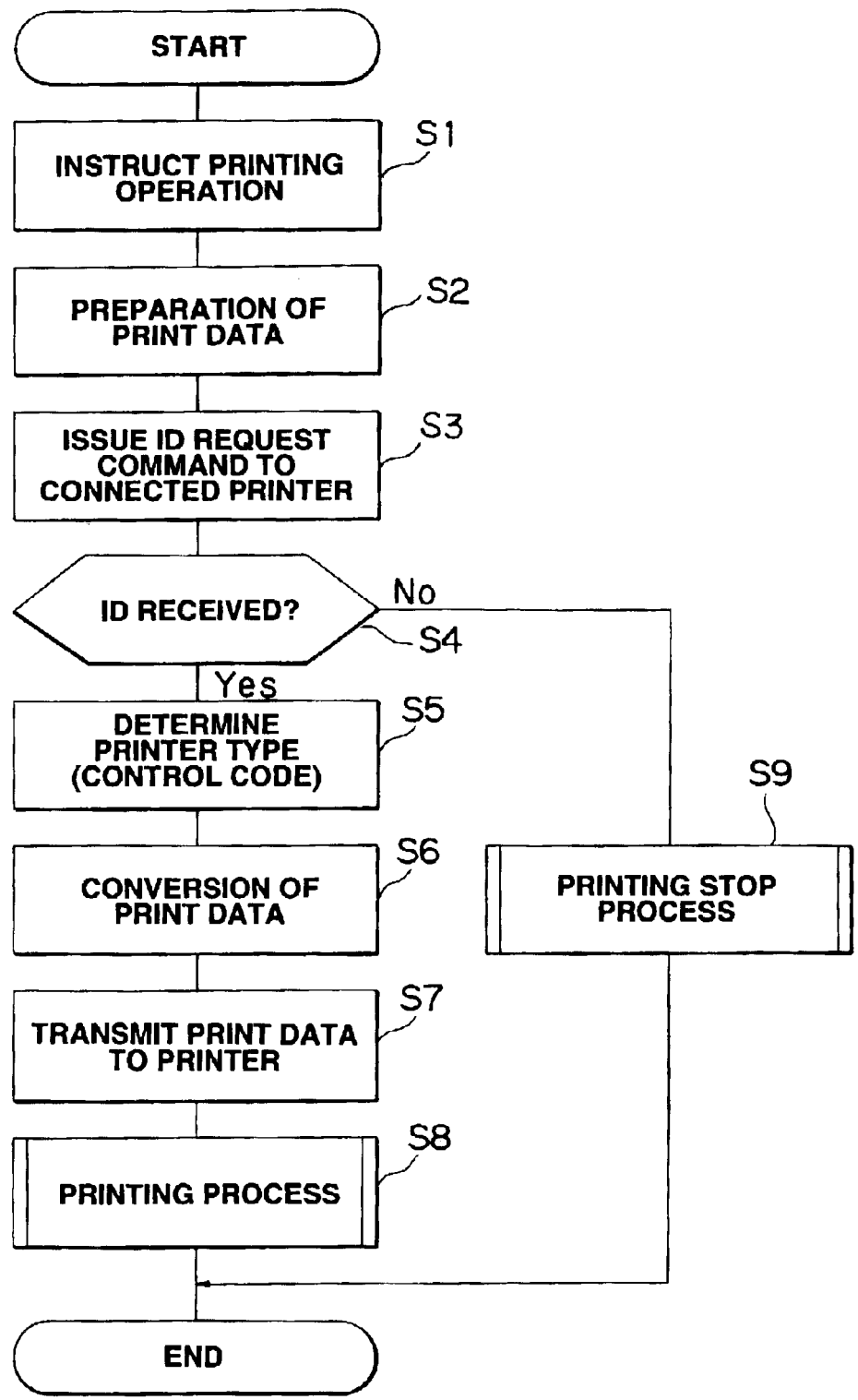
FIG. 1 is a flowchart showing the steps of a data printing method for an injection molding machine according to an embodiment of the present invention.
Figure 4:
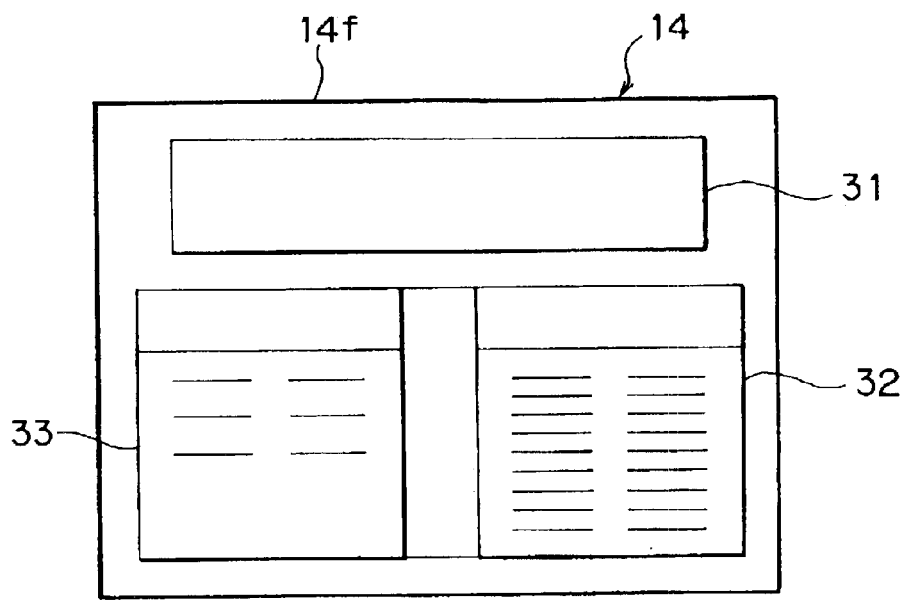
FIG. 4 is a diagram showing a screen of the display of the injection molding machine in which the data printing method can be practiced.

Next, a data printing method according to the present embodiment will be described in accordance with the flowchart of FIG. 1 and with reference to FIGS. 2 to 4.

First, an arbitrary printer P is prepared and placed on the printer pedestal 28. Subsequently, the printer cable 29 is connected between the connector of the printer P and the connector 27 of the injection molding machine M. The present embodiment exemplifies the case in which the printer P has a bi-directional parallel interface conforming to IEEE1284, the printer cable 29 is a parallel interface cable, and print data are image data (bit-map data).

When printing is to be performed, an operator confirms that the power of the printer P has been turned on, and depresses a print key of the touch panel 15 provided on the display 14 to thereby instruct printing operation (step S1). In response thereto, print data are produced and stored in the molding machine memory (RAM 12) (step S2). Further, the printer judgment function Fi; i.e., the judgment program Ai, of the controller 3 transmits to the printer P a command for requesting a printer ID (step S3). In response thereto, the printer P transmits a printer ID (information, such as manufacturer name and model name) to the controller 3. Upon receipt of the printer ID, the controller 3 determines the type of the printer P on the basis of the printer ID (steps S4 and S5). The above judgment process is performed before printing. The expression "before printing" refers to any point of time between a point immediately after connection of the printer P and a point immediately before start of printing. In the case in which only the judgment process is to be performed, the operator depresses a printer confirmation key or a like key, which is provided independently of the print key, in order to instruct performance of the judgment process.

During printing, the data conversion function Fc; i.e., the conversion program Ac, of the controller 3 converts the print data to control codes that match the type of the printer P determined by means of the printer judgment function Fi (step S6). The print data having undergone conversion by the data conversion function Fc are transferred to the printer P (step S7), so that the printer P performs an ordinary printing process (step S8).

When the controller 3 fails to receive a printer ID in step S4; i.e., when the controller 3 does not receive a printer ID despite transmission of a printer ID request command to the printer, the controller 3 performs a print stop process, and displays a message to the effect that the printer P cannot be used (step S9). Such display may be performed on the display screen 14f of the display 14 shown in FIG. 4 in such a manner that a message indicating that printing cannot be performed by use of the connected printer is displayed in a first display area 31; a list (history) of printers which have used, in past printing, print data to be printed at the present time is displayed in a second display area 32; and a list of usable printers is displayed in a third display area 33. Such display of lists enables quick printer exchange, for example, in the case in which a plurality of printers P which differ in control code (type) are prepared in a molding plant or a like plant and are shared by a plurality of injection molding machines M.

In the data printing method for the injection molding machine M according to the present embodiment, after the printer P is connected to the injection molding machine M, the process for operationally connecting the printer P to the controller 3 is performed automatically. Specifically, when the operator depresses the "print key" in order to start printing or depresses the "printer confirmation key" during a period in which printing is not performed, the printer connection process is performed automatically. Therefore, the operator is not required to perform cumbersome setting operation and to have knowledge about printer connection. Also, an unnecessary increase in the number of production steps is eliminated in order to enhance production efficiency and convenience. Moreover, since the type of a printer is determined on the basis of its printer ID, even when a printer of a new type is connected to the injection molding machine, printing can be performed if control codes corresponding to the printer ID are present. Therefore, the data printing method according to the present invention can flexibly cope with new printers to thereby enhance compatibility and expandability.

While the present invention has been described with reference to the preferred embodiment, the present invention is not limited thereto. Regarding structural details and method, among other aspects, modifications and any omission or addition may be possible as needed without departing from the scope of the invention.

What is claimed is:

1. A data printing method for an injection molding machine adapted to print data by use of a printer connected to a printer connection section of the injection molding machine, the method comprising:

providing, in a controller of the injection molding machine, a printer judgment function for determining a type of the printer based on a printer I.D. received from the printer, and a data conversion function for converting print data to control codes suitable for the type of printer;

determining, before printing, a type of the printer connected to the printer connection section by means of said printer judgment function; and converting, during printing, print data to control codes suitable for the determined type of printer by means of the data conversion function, and transmitting the control codes to the printer.

2. The data printing method for an injection molding machine according to claim 1, wherein the before printing is a period of time between a point immediately after connection of the printer and a point immediately before the start of printing.

3. The data printing method for an injection molding machine according to claim 1, wherein the printer judgment function is realized by a judgment program which transmits to the printer a command for requesting the printer ID.

4. The data printing method for an injection molding machine according to claim 3, wherein when the printer judgment function does not receive the printer ID, the printer judgment function performs a print stop process and displays a message to the effect that the printer cannot be used.

5. The data printing method for an injection molding machine according to claim 4, wherein the printer judgment function displays a list of printers which have been used, in the past for printing, print data to be printed at the present time and/or a list of usable printers.

6. The data printing method for an injection molding machine according to claim 1, wherein the data conversion function is realized by a conversion program for converting print data to control codes suitable for the type of printer determined by the printer judgment function and for transmitting the control codes to the printer.

7. The data printing method for an injection molding machine according to claim 6, wherein the conversion program includes a plurality of sub-programs for converting print data to includes control codes corresponding to a plurality of printer manufacturers.

* * * * *